United States Patent [19]

Dummer et al.

[11] Patent Number: 4,606,742
[45] Date of Patent: Aug. 19, 1986

[54] NOVEL HEAT RECOVERY PROCESS

[75] Inventors: Gerhard Dummer, Burgkirchen; Ludwig Schmidhammer, Haiming; Peter Hirschmann; Gerhard Stettner, both of Burghausen, all of Fed. Rep. of Germany

[73] Assignee: Wacker-Chemie GmbH, Fed. Rep. of Germany

[21] Appl. No.: 743,161

[22] Filed: Jun. 10, 1985

[30] Foreign Application Priority Data

Oct. 2, 1984 [DE] Fed. Rep. of Germany ....... 3436139

[51] Int. Cl.$^4$ .............................................. B01D 53/14
[52] U.S. Cl. ........................................... 55/27; 55/71
[58] Field of Search ................... 55/27, 71, 73, 80, 89

[56] References Cited

U.S. PATENT DOCUMENTS

| | | | |
|---|---|---|---|
| 2,490,454 | 12/1949 | Myers | 55/71 X |
| 2,497,421 | 2/1950 | Shiras | 55/27 X |
| 2,675,889 | 4/1954 | Frey | 55/27 |
| 2,675,890 | 4/1954 | Frey et al. | 55/27 |
| 3,807,139 | 4/1974 | Di Fiore et al. | 55/71 |

*Primary Examiner*—Robert Spitzer
*Attorney, Agent, or Firm*—Bierman, Peroff & Muserlian

[57] ABSTRACT

In a method of recovering heat from flue gas resulting from the combustion of chlorinated organic compounds at 900° to 1300° C. at a pressure of 0.9 to 1.5 bar absolute whereby the flue gas is cooled with the recovery of heat and hydrogen chloride is processed, the improvement comprising (a) cooling the flue gas in a first step to a temperature of 250° to 350° C. with a contact time of 0.05 to 0.15 seconds, (b) cooling the flue gas in a second step to a minimum of 140° C. with a contact time of 1.3 to 2.0 seconds, the cooling medium in both stages being water flowing at an initial temperature of 100° to 140° C. in step (b) counter to the flue gas flow direction and added to cooling stage (a) at a temperature of 200° to 220° C. and (c) cooling the flue gas in a third stage to its dew point and scrubbing it with water to recover the hydrogen chloride therein in solution.

2 Claims, No Drawings

NOVEL HEAT RECOVERY PROCESS

STATE OF THE ART

In the industrial production of chlorinated organic compounds, certain amounts of undesired chlorinated organic by-products are produced which are best disposed by high temperature burning. Preferably, the combustion process is controlled so that the chlorine component occurs almost quantitatively as hydrogen chloride and not gaseous chlorine or only traces thereof and it should be soot-free and ash-free. To control the combustion process and the subsequent processing of the flue gas, a large number of chemical equations must be taken into consideration such as the Deacon equilibrium between HCl, $O_2$, and $Cl_2$, the Boudouard equilibrium, equilibrium between CO, $CO_2$ and $O_2$ among others. Moreover, the corrosion problems arising in the processing of the chemically corrosive flue gas have to be controlled.

Until now, the procedure adopted in practice has been as follows: The combustion took place with an excess of oxygen and usually with addition of extra fuel to obtain a sufficiently high calorific power of the mixture and the flue gas leaving the combustion chamber was first cooled in a water-cooled waste-heat boiler to temperatures of 250° to 350° C. and was then quenched to below its dew point in a corrosion proof installation, for example a corrosion proof quencher, and subjected to flue gas scrubbing. The corrosion problems occurring in the waste-heat boiler are actually well controllable, since at the prevailing temperatures the primary corrosion product, iron chloride, is transformed into magnetite which, being a firmly adhering coating, passivates the walls of the waste-heat boiler. For this reason, the waste-heat boiler could be made of non-alloyed steel.

While the energy released to the cooling water in the waste-heat boiler would be further utilized as high-pressure steam, the residual energy of the flue gas leaving the waste-heat boiler was lost. Besides, large quantities of desalted water had to be used for scrubbing the flue gas, which for the most part were emitted into the environment in the form of high steam clouds together with the scrubbed flue gas which entails considerable pollution.

Further cooling, with the possible recovery of energy of the flue gases between the waste-heat boiler and flue gas scrubber was dispensed with until now. The reasons for this are that in the temperature range of from about 100° to 350° C., the corrosion problems are of an entirely different nature than in the waste-heat boiler described before. At this temperature, the primary corrosion product, iron chloride, is no longer transformed into iron oxide. Instead, any iron chloride formed continuously sublimates and thus exposes free surface for further corrosive attack. Besides, the presence of iron chloride catalyzes the adjustment of the Deacon equilibrium with the result that at the prevailing temperatures, the formation of extremely corrosive elementary chlorine was to be expected. Moreover, the installation of a corrosion proof cooling stage was dispensed because of costs.

OBJECTS OF THE INVENTION

It is an object of the invention to provide an improved process for recovering larger amounts of energy from the flue gases from pyrolysis of chlorinated organic compounds.

This and other objects of the invention will become obvious from the following detailed description.

THE INVENTION

The method of the invention for recovering heat from flue gas resulting from the combustion of chlorinated organic compounds at 900° to 1300° C. at a pressure of 0.9 to 1.5 bar absolute whereby the flue gas is cooled with the recovery of heat and hydrogen chloride is processed comprises the improvement of (a) cooling the flue gas in a first step to a temperature of 250° to 350° C. with a contact time of 0.05 to 0.15 seconds, (b) cooling the flue gas in a second step to a minimum of 140° C. with a contact time of 1.3 to 2.0 seconds, the cooling medium in both stages being water flowing at an initial temperature of 100° to 140° C. in step (b) counter to the flue gas flow direction and added to cooling stage (a) at a temperature of 200° to 220° C. and (c) cooling the flue gas in a third stage to its dew point and scrubbing it with water to recover the hydrogen chloride therein in solution. The expected corrosion problems by the insertion of an additional cooling step between the waste-heat boiler and the quenching apparatus are controlled or avoided if the said process parameters are maintained.

The chlorinated organic compounds to be subjected to thermal combustion with recovery of hydrogen chloride are known and are particularly the constituents of waste gases occuring in the products, processing and storage of chlorinated hydrocarbons, distillations residues, etc.

The combustion is effected with excess oxygen at 900° to 1300° C. at a pressure of 0.9 to 1.5 bar absolute and occassionally additional fuel is added to obtain sufficiently high caloric value of the mixture. This can be effected in the form of a supporting flame fed with fuel gas, for example.

The flue gas leaving the combustion chamber is basically comprised of hydrogen chloride, steam, carbon dioxide, carbon monoxide, oxygen, nitrogen and traces of chlorine. The first stage quenching to a temperature of 250° to 350° C. with a contact time of 0.05 to 0.15 seconds may be effected in a heat exchanger consisting of a waste-heat boiler of the fire-tube boiler type, for example, in which the flue gas flows through the tubes and is cooled on the jacket side with boiling water. This heat exchanger can be a relatively small, compact unit made of unalloyed steel due to the favorable temperature gradients between flue gas and the tube wall.

The flue gas with a temperature of 250° to 350° C. is then fed to a second heat exchanger which is arranged so that the flue gas leaving the second stage after a contact time of 1.3 to 2.0 seconds has a temperature of 140° to 160° C. The cooling water flows through the heat exchanger counter current to the flue gas flow direction and its initial temperature is 110° C., preferably 120° to 125° C. and the exit temperature is 200° to 220° C. The said preheated water is then fed into the first heat exchanger wherein it exits the heat exchanger as high pressure steam. Normally the heat of the flue gas released to the cooling medium in this cooling step occurs mostly as energy of water evaporation and the steam obtained is at a pressure of 18 to 21 bar absolute. The said steam can be used in any suitable way such as for heating distillation columns and the like.

The second stage heat exchanger is designed in accordance with the process parameters and boiler type apparatus equipped with finned cooling tubes have generally proved successful. The flue gas traverses the heat exchanger on the jacket side while the cooling medium flows through the finned tubes which are usually in the form of cooling coils. When the process parameters are observed, the second stage heat exchanger may be made of unalloyed steel and corrosion resistant equipment is not required.

The flue gas cooled to 140° to 160° C. in the second cooling step is then subjected to processing in a third stage with production of hydrochloric acid. The cooling below the dew point of the flue gas is best effected by direct cooling with water and possibly with hydrochloric acid already obtained which is recycled. This third cooling stage may be built for example in the form of a quenching apparatus made corrosion proof with following waste gas scrubbing, from which, after intensive scrubbing, the flue gas is released into the environment.

By the method of the invention, it is possible to recover a greater amount of energy from the flue gases occurring in the combusion of chlorinated organic compounds than has been the case until now. Moreover, due to the smaller volume of flue gas, the condensation and scrubbing process is more efficient and more ecophile in the end.

In the following example there are described several preferred embodiments to illustrate the invention. However, it should be understood that the invention is not intended to be limited to the specific embodiments.

EXAMPLE 12,000 Nm$^3$/h of waste gases from an ethylene oxychlorination, 400 Nm$^3$/h of process waste gases from the direct chlorination of ethylene, the distillation and storage of 1,2-dichloroethane, 300 kg/h of low-boiling fractions of the empirical formula $C_{1.35}H_{2.3}Cl_{2.3}$, 900 kg/h of high-boiling fractions of empirical formula $C_{2.1}H_{3.5}Cl_{3.5}$ and 1,500 Nm$^3$/h of hydrogen chloride contaminated with 0.4 mol % of carbon tetrachloride and 10 vol. ppm of perchloroethylene were incinerated at 950° C. at 0.965 bar absolute in a combustion chamber with a residence time of 0.03 sec while adding 450 Nm$^3$/h of natural gas and 9,5000 Nm$^3$/h of air.

The combustion of the ethylene oxychlorination waste gases was 2 mol % of hydrogen chloride, 0.5 mol % of carbon monoxide, 0.7 mol % of carbon dioxide and 0.15 mol % of 1,2 dichloroethane, 0.25 mol % of ethyl chloride, 0.05 mol % of ethylene, 2.0 mol % of oxygen and 94.35 mol % of nitrogen plus argon.

Composition of the process waste gases from the direct chlorination of ethylene was 2 mol % of hydrogen chloride, 2 mol % of 1,2-dichloroethane, 2 mol % of ethyl chloride, 4 mol % of vinyl chloride, 5 mol % of oxygen, 2 mol % of ethylene and 83 mol % of nitrogen.

The flue gas leaving the combustion chamber at a temperature of 950° C. totaled 24,348 Nm$^3$ of the following composition: 9.4 mol % of hydrogen chloride, 4.2 mol % of steam, 4.7 mol % of carbon dioxide, 3.0 mol % of oxygen, 78.7 mol % of nitrogen, 200 vol. ppm of chlorine and less than 10 vol. ppm of carbon monoxide. The flue gas was conveyed into a waste-heat boiler where it was cooled at a contact time of 0.15 second to 320° C. The flue gas effluent from the waste-heat boiler was then introduced into a second heat exchanger equipped with finned cooling coils. It was cooled in a contact time of 1.67 seconds to 150° C. The flue gas effluent from the second heat exchanger then flowed into a quenching apparatus where it was cooled to a dew-point limit of 52° C. The quantity of flue gas at the stack exit behind the scrubber was in the end 28,300 Nm$^3$/h.

The second heat exchanger was fed with 12.3 m$^3$/h of water with a temperature of 120° C. at a pressure of 20.5 bar and at the exit of the boiler feed-water preheater, the temperature of the cooling water was 213° C. At this temperature, the water was pumped to the waste-heat boiler at a pressure of 20 bar. Finally, at the cooling medium exit of the waste-heat boiler, 12.3 t/h of steam under a pressure of 19 bar abs. occurred. The generated steam was supplied to the plant system. After operation for one year, no signs of corrosion or fouling of the tube fins were found in the region of the second heat exchanger.

COMPARISON EXAMPLE

The procedure of the example was repeated with the modification that an additional cooling stage between the waste-heat boiler and quenching apparatus was dispensed with. The same amount of flue gas of the same composition was also cooled in the waste-heat boiler. The waste-heat boiler was fed with cooling water which, however, had a temperature of only 120° C. as the second heat exchanger was missing. The steam generation decreased to 9.3 t/h with a loss of 3 t/h as compared with the procedure of the invention. Besides, the flue gas reached the quenching apparatus with a temperature of 320° C., where it was cooled to a dew point limit of about 67° C. Due to the higher dew point temperature, about 40% more water was evaporated causing the flue gas quantity at the stack exit after the scrubber to increase to 31,500 Nm$^3$/h.

Various modifications of the process of the invention may be made without departing from the spirit or scope thereof and it should be understood that the invention is intended to be limited only as defined in the appended claims.

What we claim is:

1. In a method of recoverying heat from flue gas resulting from the combustion of chlorinated organic compounds at 900° to 1300° C. at a pressure of 0.9 to 1.5 bar absolute whereby the flue gas is cooled with the recovery of heat and hydrogen chloride is processed, the improvement comprising (a) cooling the flue gas in a first step to a temperature of 250° to 350° C. with a contact time of 0.05 to 0.15 seconds, (b) cooling the flue gas in a second step to a minimum of 140° C. with a contact time of 1.3 to 2.0 seconds, the cooling medium in both stages being water flowing at an initial temperature of 100° to 140° C. in step (b) counter to the flue gas direction and added to cooling stage (a) at a temperature of 200° to 220° C. and (c) cooling the flue gas in a third stage to its dew point and scrubbing it with water to recover the hydrogen chloride therein in solution.

2. The process of claim 1 wherein the cooling water of the second heat exchanger has an initial temperature of 120° to 125° C.